Patented Dec. 30, 1952

2,623,829

UNITED STATES PATENT OFFICE 2,623,829

BENZYLATED SOYA PROTEIN AND PROCESS FOR MAKING SAME

Allan E. Gilchrist, Fairview Village, Ohio, and Walter J. Koenig, Oak Park, Ill., assignors to The Glidden Company, Cleveland, Ohio, a corporation of Ohio No Drawing. Application January 6, 1949, Serial No. 69,606

16 Claims. (Cl. 106—154)

This invention relates to a novel soya protein product and to processes for producing said product. More specifically, it relates to a benzylated soya protein product which is soluble in acetone.

A soya protein product which is soluble in acetone has long been desired for technical purposes, but such a product has not heretofore been known. In the course of our work with soya protein, we have found that by treating soya protein with benzyl chloride in accordance with a process hereinafter to be described, a benzylated product is obtained which is readily soluble in acetone.

Accordingly, it is an object of this invention to provide a process for producing an acetone-soluble benzylated soya protein.

Another object is to provide a process for exhaustively benzylating soya protein.

It is a further object to provide acetone-soluble benzylated soya protein as a novel product.

It is another object to provide novel coating compositions comprising acetone-soluble benzylated protein, and to provide molded bodies comprising such material.

These and other objects will be apparent from the following description of the invention.

We have found that by treating an aqueous alkaline dispersion of soya protein with benzyl chloride and thereafter treating the aqueous mass alternately with alkaline reagents and benzyl chloride, a proteinaceous precipitate which is soluble in acetone may be secured. Preferably in this treatment the pH is allowed to range up to about 11 (after treatment with alkaline reagents) and then to about 4.6 (after treatment with benzyl chloride). Furthermore, one should work within the above preferred pH limits while yet introducing such a total amount of benzyl chloride that the ratio of benzyl chloride to soya protein is at least 1.6 to 1, and is preferably between about 2 to 1 and 3 to 1. A ratio of at least 1.6 to 1 is required to benzylate the whole of the soya protein, but the higher ratios of between 2 and 3 to 1 are preferred because they improve the product.

The amount of alkaline material which is used is of course determined by the above mentioned pH limits. Any water-soluble alkaline compounds may be used which are effective in dispersing soy protein, such as alkali-metal hydroxides or carbonates, ammonia, borax, trisodium phosphate, etc.

While we prefer to use an isolated soya protein (i. e., proteinaceous material which has been extracted from soya beans in such manner that it has been substantially freed from the non-proteinaceous components of the beans), the whole comminuted bean and meals or flours prepared from oil-extracted beans may be used equally well. With all types of soy bean material, it is essential that the proteinaceous components be first dispersed in aqueous alkaline solutions which preferably have a pH not substantially higher than 11 after dispersion has been effected. Higher pH values may be used but have been found to be unnecessary. A part of the total benzyl chloride required for a predetermined benzyl chloride: protein ratio is then added to the dispersion in such selected amount that the pH of the reaction mass does not drop appreciably below the iso-electric point of the protein, which is about 4.6. The reactions may be carried out at room temperature but it is desirable to heat the reaction mass to hasten the reactions. Temperatures between about 150° F. and 200° F. are preferred, and a temperature of about 180° F. is especially preferred since at this temperature the reactions appear to be highly efficient. After the iso-electric point of the protein has been attained and a precipitate has formed, the cycle may be repeated by first adding additional alkaline material and then introducing a second selected portion of benzyl chloride. Such alternate treatment may be continued through as many cycles as desired until a proteinaceous precipitate which is wholly or partially soluble in acetone is formed at the iso-electric point of the so-treated protein.

The process will be understood more thoroughly by reference to the following examples.

Example 1

Two hundred parts by weight of commercial grade isolated soya bean protein were slurried in 1000 parts of water. Twenty-five parts of sodium hydroxide were dissolved in 200 parts of water and the resulting solution was added to the slurry. One hundred parts of benzyl chloride were then added and the whole mass was heated with constant agitation until the temperature had reached 180° F.; this temperature was then held with agitation for 5 minutes after which the mass was allowed to stand for 30 minutes. During this latter period the pH dropped to 5, and a precipitate formed. Twenty-five parts of sodium hydroxide in 200 parts of water were then added to the mass, and heat was applied with agitation until the temperature of 180° F. had been maintained for 15 minutes. The precipitate gradually redissolved during the course of this treatment. After the precipitate had all been redissolved, 100 parts of benzyl chloride were added. The pH of the solution was 11 when the benzyl chloride was introduced, but after about 15 minutes it had dropped to 5 and a soft precipitate formed. A sample of the precipitate did not completely dissolve in acetone although a portion thereof was soluble. Twelve and one-half parts of sodium hydroxide in 100 parts of water were then added with agitation and with heat sufficient to maintain the temperature at 180° F., until the precipitate redissolved. The pH was then about 7. Twelve and one-half parts of sodium hydroxide in 100 parts of water were then added and the whole mass was agitated for ten minutes at 180° F. One hundred and twenty parts of benzyl chloride were then introduced. After an additional ten minutes the pH had dropped to 5 and a precipitate had formed. A sample of the precipitate dissolved readily in acetone. The whole precipitate was then filtered off, washed and dried.

A quantity of the dry precipitate was dissolved in acetone and the resulting solution was flowed onto a glass panel. When the film was dry it was found to be very flexible, transparent and water white.

A quantity of the dry precipitate was molded under pressure at a temperature of 250° F. into a dense hard transparent body of a light tan color having smooth glossy surfaces. The molded body had very good strength. When first mixed with wood flour in amounts giving high ratios of flour to benzylated protein (ratios as high as 1 to 3), the mixture could also be molded at 250° F. at this temperature exhibited excellent flow properties. The resulting molded body had very smooth surfaces and very good strength. Other fillers may also be used similarly.

A quantity of the dry precipitate was dissolved in hot ethyl alcohol and yielded light-colored flexible dry films when flowed on glass.

Example 2

Two hundred twenty-five parts of soy flour containing 45% protein were treated as described in Example 1. A test quantity of the proteinaceous precipitate which developed after the last treatment with benzyl chloride was soluble in acetone, and after the precipitate was thoroughly washed to remove non-proteinaceous matter, and was dried, the benzylated produce could be dissolved in acetone or hot alcohol to give coating compositions, and could be molded in the manners described in Example 1 to give strong transparent bodies.

In the foregoing examples the soya protein content of the starting material was exhaustively benzylated by employing successive treatments which finally brought the entire protein content to a condition of solubility in acetone. Such exhaustive treatment is not required for some intended uses of the protein, since molded bodies may be made from partially-benzylated soya protein. Moreover, the acetone-soluble portion of a partially-benzylated protein may be extracted with acetone after which the residue may be again treated to benzylate a further fraction thereof. In such manners, coating compositions may be prepared without exhaustively benzylating a given quantity of soya protein.

From the foregoing description, it will be understood that we accomplish the objects of our invention by causing benzyl chloride to react on an alkaline dispersion of soya protein. When it is desired that the whole of the soya protein be benzylated to a condition of solubility in acetone, at least 1.6 parts of benzyl chloride are needed per part of soya protein. When only a part of the entire quantity of protein in the reaction mixture is benzylated, the same minimum ratio prevails with respect to that quantity of protein which is benzylated, but under such conditions it will be apparent that the ratio of benzyl chloride to the whole of the soya protein may be any lesser value, and that correspondingly lesser yields of benzylated protein will be secured. It should also be understood that stepwise benzylation of the whole quantity of protein in the reaction mixture is an essential feature of our exhaustive benzylation treatment, since we have found that if the whole quantity of benzyl chloride corresponding to between 1.6 and about 3 parts thereof to 1 part protein is introduced at the beginning, then the precipitate which forms is not wholly soluble in acetone and does not correspond in other properties to be acetone-soluble precipitate obtained by stepwise treatment of the protein with the same quantity of benzyl chloride.

Having described the invention, what we claim is:

1. The method of producing a benzylated soya protein product which is soluble in acetone, which method comprises: treating an aqueous initially alkaline dispersion of soya protein solely with sufficient benzyl chloride to effect precipitation of a proteinaceous mass from said aqueous liquor at about the iso-electric point of said mass, separating said mass from the liquor, and extracting the mass with acetone.

2. The method of producing a benzylated soya protein product which is soluble in acetone, which method comprises: treating an aqueous initially alkaline dispersion of soya protein solely with sufficient benzyl chloride to effect precipitation of a proteinaceous mass from said aqueous liquor at about the iso-electric point of the proteinaceous material of said mass, separating said mass from the liquor, and extracting the mass with acetone to recover a quantity of the benzylated soya protein product; re-dispersing in an aqueous alkaline solution the portion of the proteinaceous mass which remains after said extraction, and repeating the foregoing treatment by treating the alkaline re-dispersion solely with benzyl chloride and then again extracting the resulting proteinaceous precipitate with acetone to recover additional quantities of the benzylated soya protein product.

3. The method of producing an exhaustively benzylated soya protein product which is completely soluble in acetone, which comprises: dispersing isolated soya protein in an aqueous alkaline solution to produce a dispersion solely; treating said dispersion with benzyl chloride until the protein of said dispersion is precipitated at about its iso-electric point; re-dispersing said precipitate in the liquor by adding alkali to the liquor to attain an alkaline dispersion; again treating solely with sufficient additional benzyl chloride to effect precipitation of the protein content of the dispersion; and repeating the alternating treatment with alkali and benzyl chloride until the ratio of total weight of benzyl chloride employed in said treatments to the total initial weight of isolated protein is at least 1.6 to 1.

4. The method as claimed in claim 3 wherein the total weight of benzyl chloride employed bears a ratio to the total initial protein of between 2 and 3 to 1.

5. The method as claimed in claim 3 wherein the treatments are carried out at temperatures between about 150° F. and 200° F.

6. The method as claimed in claim 5 wherein the pH of the alkaline dispersions of protein is not substantially greater than about 11.

7. A method for producing a benzylated soya protein product which is soluble in acetone, said method comprising the steps of treating an aqueous slurry of isolated soya protein successively and alternately solely with alkaline reagents and benzyl chloride in quantities which cause the pH of the slurry to range from between about 8 and about 11 after treatment solely with the alkaline reagents to between about 6 and about 4.6 after treatment solely with benzyl chloride, said treatment being repeated until the entire precipitate which forms below a pH of about 6 after treatment with benzyl chloride is soluble in acetone.

8. The method as claimed in claim 7 wherein the total benzyl chloride employed in said treatments bears a weight ratio to the total initial soya protein of between about 2 to 1 and 3 to 1.

9. A method for producing a benzylated soya protein product which is soluble in acetone, said method comprising the steps of: treating an aqueous dispersion of soya protein in stepwise succession first with alkaline reagents in sufficient quantity to establish a pH between about 8 and 11, and then solely with benzyl chloride in sufficient quantity to establish a pH between about 4.6 and 6; and then repeating the stepwise treatments until the proteinaceous precipitate which forms after the last treatment with benzyl chloride is wholly soluble in acetone.

10. The method as claimed in claim 9 wherein the total benzyl chloride employed in said treatments bears a weight ratio to total initial soya protein of between about 2 to 1 and 3 to 1.

11. The method as claimed in claim 10 wherein the treatments are carried out at temperatures between about 150° F. and 200° F.

12. The method as claimed in claim 9 wherein the treatments are carried out at temperatures between about 150° F. and 200° F.

13. Acetone-soluble benzylated soya protein.

14. A compressed and molded transparent body of acetone-soluble benzylated isolated soya protein.

15. A compressed, molded body composed of a major amount of acetone-soluble benzylated soya protein and a minor amount of filler.

16. A coating composition comprising an acetone solution of benzylated soya protein.

ALLAN E. GILCHRIST.
WALTER J. KOENIG.

REFERENCES CITED

The following references are of record in the file of this patent:

FOREIGN PATENTS

| Number | Country | Date |
|---|---|---|
| 420,105 | Canada | May 9, 1944 |

OTHER REFERENCES

Olcott et al., "Specific Group Reagents for Proteins," Chemical Reviews, vol. 41, No. 1, August 1947, p. 180.